United States Patent [19]

Cerny et al.

[11] Patent Number: 4,860,890
[45] Date of Patent: Aug. 29, 1989

[54] BATTERY HOLDER

[75] Inventors: Elmer J. Cerny, Des Plaines; Mark F. Stanton, Mundelein, both of Ill.

[73] Assignee: Beltone Electronics Corporation, Chicago, Ill.

[21] Appl. No.: 238,895

[22] Filed: Aug. 31, 1988

[51] Int. Cl.⁴ .............................................. B65D 73/02
[52] U.S. Cl. .................................................. 206/333
[58] Field of Search .................... 206/333, 345, 343

[56] References Cited

U.S. PATENT DOCUMENTS

| 35,902 | 7/1862 | Sturtevant | 206/345 |
| 4,015,708 | 4/1977 | Kelm | 206/333 |
| 4,166,532 | 9/1979 | Tsuchida et al. | 206/333 |
| 4,209,091 | 6/1980 | Lieberman | 206/333 |
| 4,621,486 | 11/1986 | Slavicek | 206/345 |
| 4,696,402 | 9/1987 | Harmon et al. | 206/333 |

FOREIGN PATENT DOCUMENTS 572543  3/1959  Canada ................................ 206/333

Primary Examiner—Joseph Man-Fu Moy
Attorney, Agent, or Firm—Allegreti & Witcoff, Ltd.

[57] ABSTRACT

An apparatus for storing and dispensing small batteries. The apparatus eases the process of inserting such batteries into small electrical devices. The apparatus includes a plurality of handles, a base member removably attached to each of the handles, and a cover to envelop the plurality of handles and the cover. A small battery is removably attached to the end of each handle, allowing the use of the handle for assisting with the insertion of the battery into a small battery well. The plurality of the handles are stored in a "matchbook" type package, allowing the removal of one handle and continued storage of the remainder.

4 Claims, 1 Drawing Sheet

U.S. Patent    Aug. 29, 1989    4,860,890
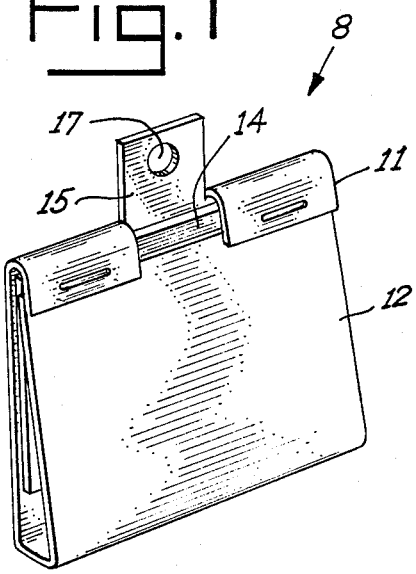
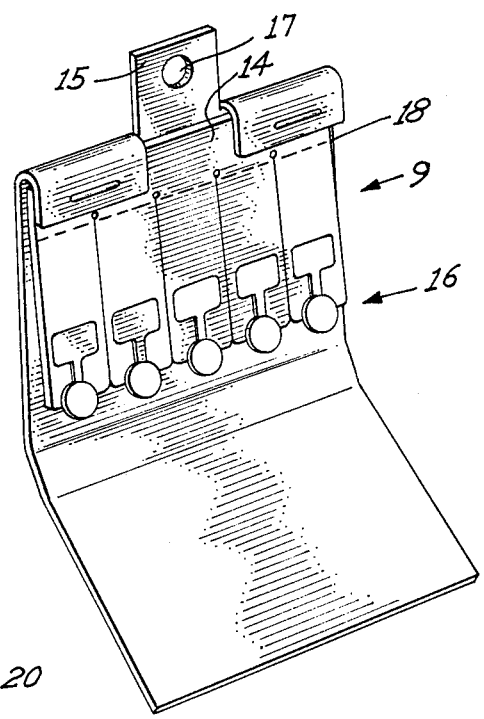
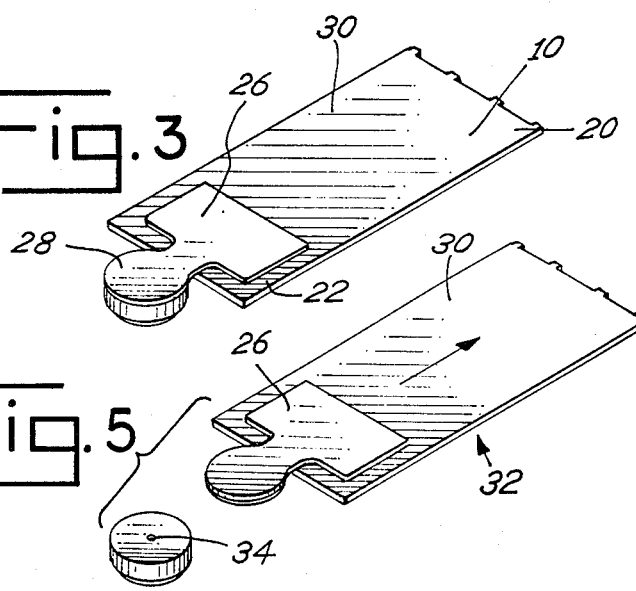
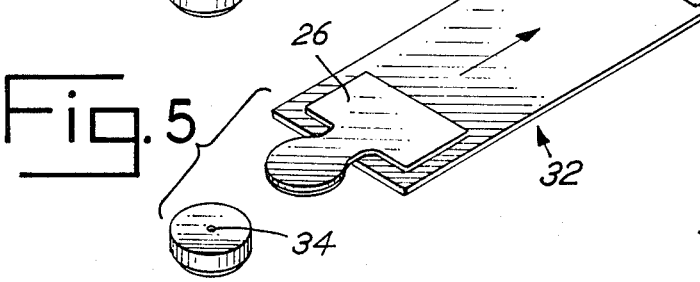
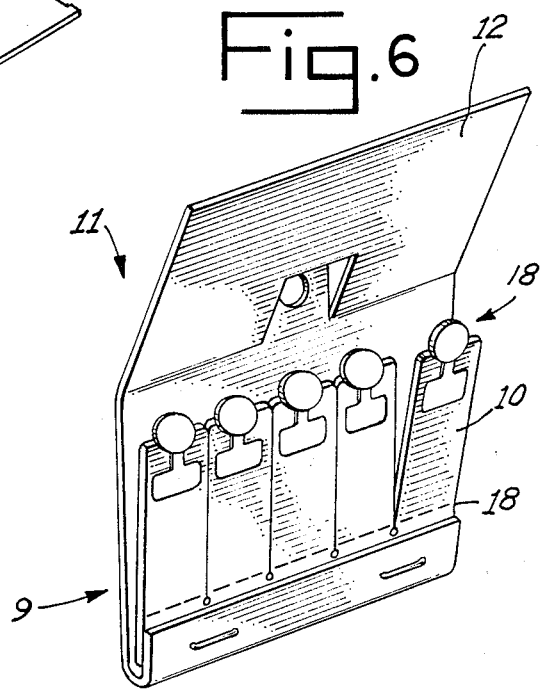
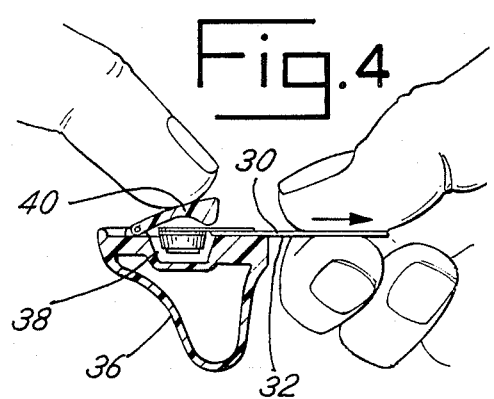

BATTERY HOLDER

BACKGROUND OF THE INVENTION

This invention relates to devices that aid in the insertion of small batteries into battery wells. The invention also relates to an assembly for easy storage and access to small batteries.

Specifically, this device is intended to aid for the insertion of batteries into small devices, such as hearing aids. Such devices are generally used by older people who may have greater difficulty with sight or muscular control. Moreover, hearing aids, and the batteries that are held within them, have become increasingly miniaturized, increasing the difficulty associated with handling both hearing aids and hearing aid batteries. Therefore, a need exists to ease the process of inserting batteries into hearing aids. This is especially true, since the placement of batteries into device such as hearing aids is a common event.

The prior art includes at least four methods for insertion of a battery. A first method entails simply inserting a battery by hand. An individual grasps the battery between his or her fingers and drops the battery in the battery well. Many batteries, of course, are too small to be easily grasped.

A second method requires the individual to place the battery into the battery well located in the cover of a device. Closing the cover places the battery into the battery well.

A third prior art mechanism includes the use of tongs. Using the tongs, the individual grips the battery, picks it up, and places it in the batter well.

A fourth method involves the use of a magnet or wax on the end of a tool. Generally, the battery may be placed on the end of the tool. The magnet or wax holds the battery while it is placed into the battery well. Once the battery is in the battery well, the tool may be slid off to one side of the battery and the cover closed.

One of the problems with such devices and methods is that they require a reasonably high level of dexterity on behalf of the individual inserting the battery. This is especially true for a battery commonly used in such devices, the zinc-air battery. Such batteries come with a plastic strip covering an air vent. The strip must be removed in order to activate the battery. None of these devices or methods allow for removal of the strip. Therefore, the strip must be removed prior to the insertion of the battery into the battery well.

Removal of the strip on a small battery may not be an easy task for a person who is physically impaired or otherwise lacks substantial manual dexterity. Moreover, many batteries, such as mercury batteries often lack any tab. Such a battery may lack a clear indication of which side should be inserted first for proper operation of the electrical appliance. Accordingly, a small battery may easily be mis-oriented upon being inserted into the appliance.

Therefore, a need remains for a device which facilitates the insertion of small batteries into electrical devices. A further need exists for a device which not only aids in the handling of batteries but also effects the removal of plastic strips necessary to activate certain types of batteries after the battery has been inserted into an electrical device.

It is thus an object of the present invention to provide a device which eases the process of inserting small batteries into small electrical devices. A further object of this invention is a package for carrying a plurality of hearing aid batteries in an easily dispensable form.

It is another object of this invention to provide a package for small batteries which can be attractivley and easily displayed for retail purposes. It is yet another object of this invention to supply a device which eases the activation of zinc-air batteries and the insertion of such batteries into small devices. A further object is an improved device to help ensure that the battery is properly oriented upon being inserted into an electrical appliance.

These and other objects, advantages and features of the invention are set forth below.

SUMMARY OF THE INVENTION

In a principal aspect, this invention comprises an apparatus for holding a small battery. The device includes a handle and means for attaching the handle to a small battery. The invention further relates to a package for the storage of a plurality of batteries. The package includes a plurality of handles and a base member. The handles extend from the base member, and a battery is attached to each of the handles. The base member is attached to a cover which envelops the plurality of handles and forms a closure.

BRIEF DESCRIPTION OF THE DRAWING

In the detailed description which follows, reference will be made to the drawing which is comprised of the following figures:

FIG. 1 is perspective view of a preferred embodiment, with the battery package in a closed state;

FIG. 2 is a perspective view of the embodiment shown in FIG. 1, with the battery package in an open state;

FIG. 3 is a perspective view of an individual "match-stick" handle shown in FIG. 2;

FIG. 4 is a side view of the "match-stick" handle shown in FIG. 3 being used to insert a battery into a hearing aid;

FIG. 5 is a perspective view of the "match-stick" handle shown in FIG. 3, with the battery detached from the "match-stick" handle; and FIG. 6 is a perspective view of the embodiment shown in FIG. 1, with the battery package in an open state and a single handle bent for removal from the package.

DETAILED DESCRIPTION OF THE PREFERRED EMBODIMENT

The preferred embodiment of the present invention is an apparatus 8 for holding and handling small batteries. FIG. 2 presents the interrelation of the elements of the present invention. As shown in FIGS. 1 and 2, the device 8 includes a plurality of "match-stick" handles 9, and a package 11. The package 11 is defined by a cover 12, base member 14, hanger tab 15, and plurality of batteries 16. The plurality of the handles 9 are stored in the matchbook-type package 11.

Matchbook-type packages are well known. FIG. 1 shows the matchbooktype package 11 in a closed position, and FIGS. 2 and 6 show the matchbooktype package 11 in an open position. The cover 12 envelopes the handles 9, which are removably attached to the base member 14. The base member 14 is stapled to the cover 12, allowing the cover 12 to be repeatedly moved between the closed and open positions. The cover 12 is positioned to envelop the handles 9 and batteries 11. The cover 12 thus encloses about the batteries 16, handles 9, and base member 14.

The cover 12 is further provided with the hanger tab 15 adapted to allow the package 11 to be hung on a retail display. The hanger tab 15 is a strip of paper cut from the cover 12 and defining an aperture 17 therein.

As shown in FIG. 2, the base member 14 is removably attached to the plurality of match-stick handles 9. In the preferred embodiment, both the handles 9 and base member 14 are made of paper, and the handles 9 and base member 14 are separated by a perforation 18. "Paper" is used in the sense of a fibrous material, and includes, for example, cardboard.

In the preferred embodiment, the base member 14 and handles 9 are formed from a single piece of paper. The paper is slit to form the handles 9 and then perforated to allow easy removal of the handles 9.

A single, elongated handle 10 is shown detached in FIG. 3. In the preferred embodiment, the handle 10 is at least ¾ inch long. The handle 10 is provided with an engaging end 20 and a battery end 22. The engaging end 20 is initially attached to the base member 14 at the perforation 18. At the battery end 22, there is provided a means for attaching a battery 24 to the handle 10. Of course, in an alternative embodiment, the battery 24 could be directly glued to the handle 10. In the preferred embodiment, however, the attaching means includes an adhesive strip 26 which is adapted with a rounded end 28 to engage the battery 24. The adhesive strip 26, in turn, is fixedly attached to the handle 10.

The handle 10 is substantially rigid. Thus, upon holding the engaging end 20 of the handle 10 horizontally, the battery end 22 drops no more than approximately five degrees. Accordingly, the position of the battery 24 is more easily manuevered.

The adhesive strip 26 leaves no substantial residue on the battery 24 when it is removed from the battery 24. As a result, the battery 24 itself does not collect dust or dirt which may affect the operation of any device that the battery 24 is powering. Adhesives of the type used to secure the adhesive strip 26 to the battery 24 are presently being used on the protective strips attached to air-zinc batteries when they are shipped from the battery manufacturer.

The adhesive strip 26 is glued to one of the handles 10. In the preferred embodiment, the adhesive strip 26 is attached to one of the handles 10 with an epoxy glue. In an alternative, equivalent embodiment, of course, the adhesive strip 26 may also be attached to one of the handles 10 with, for example, a "two-sided" tape, which has an adhesive on either side of the tape.

As shown in FIGS. 2–5, the handle 10 includes first and second sides 30, 32, and the adhesive strip 26 and battery 24 are attached to the first side 30. In an alternative embodiment, of course, the adhesive strip 26 and battery 24 may be attached to the second side 32.

The battery 24 is generally small, and, in the preferred embodiment, is no wider than a typical user's thumb or index finger. Accordingly, handling such a battery may prove difficult to a person lacking substantial dexterity in his or her fingers. The battery 24 shown in FIGS. 2–6 is often referred to as a "button-type" battery. The present invention works with any such batteries including, for example, mercury-silver oxide and zinc-air batteries.

A battery frequently used in hearing aids is a zinc-air battery. Such batteries are often stored in a dormant state, with the adhesive strip 26 covering an air access hole 34 in the battery 24. Removal of a protective barrier over the hole 34 allows air to come in contact with the zinc and activate the battery 24. See FIG. 5. Therefore, the adhesive strip 26, with its rounded end 28, acts as a protective barrier over air vent 34 and allows the battery 24 to be stored in its dormant state until the adhesive strip 26 is removed.

FIG. 4 shows the battery 24 being inserted into a small hearing aid 36 with the present invention. The hearing aid 32 includes a battery well 38 to receive the battery 24 and a battery well cover 40. Initially, a user may pick up the engaging end 20 one of the handles 10. In the preferred embodiment, the adhesive strip 26 covers the air vent 30. The adhesive strip 26, in turn, is fixedly secured to the battery end 22 of the handle 10. The handle 10 is maneuvered until the battery 24, is inserted into the battery well 38. Since the battery 24 hangs down from the handle 10, the battery 24 is naturally oriented in the correct position upon being placed into the battery well 34.

The battery well cover 40 is closed upon the battery 24, and the handle 10 is simultaneously pulled. This action removes the adhesive strip 26 from the battery 24 and exposes the air vent 34, thereby both inserting and activating the battery 24 with minimal effort.

A single preferred embodiment of the present invention has been described herein. It is to be understood, however, that change and modifications can be made without departing from the true scope and spirit of the present invention. This true scope and spirit are defined by the following claims, to be interpreted in light of the foregoing specification.

We claim:

1. An apparatus for energizing an electrical device comprising, in combination:
    a base member;
    a plurality of elongate handles extending substantially perpendicularly from said base member, each of said handles including an engaging end and a battery end, each of said handles being removably attached to said base member at said engaging end; and
    a battery removably attached to each of said handles at said battery end.

2. An apparatus as claimed in claim 1 further comprising:
    a cover, attached to said base member, for enveloping said plurality of handles and batteries and forming an enclosure about said batteries said handles; and
    securing means for securing said cover and said base member together and allowing said cover to be repeatedly opened and resecured.

3. An apparatus as claimed in claim 2 wherein in each of said handles is comprised of substantially rigid paper.

4. An apparatus as claimed in claim 2 further comprising a plurality of adhesive strips, each of said adhesive strips engaging one of said batteries and one of said handles.

* * * * *